US012337607B2

(12) United States Patent
Seitel

(10) Patent No.: US 12,337,607 B2
(45) Date of Patent: Jun. 24, 2025

(54) PRINTING APPARATUS FOR PRINTING DIRECTLY ONTO CONTAINERS

(71) Applicant: Norwalt Design, Inc., Randolph, NJ (US)

(72) Inventor: Michael Seitel, Randolph, NJ (US)

(73) Assignee: Norwalt Design, Inc., Randolph, NJ (US)

( * ) Notice: Subject to any disclaimer, the term of this patent is extended or adjusted under 35 U.S.C. 154(b) by 146 days.

(21) Appl. No.: 17/690,153

(22) Filed: Mar. 9, 2022

(65) Prior Publication Data

US 2022/0219465 A1 Jul. 14, 2022

Related U.S. Application Data

(63) Continuation-in-part of application No. 16/839,181, filed on Apr. 3, 2020, now abandoned.

(51) Int. Cl.

| | |
|---|---|
| ***B41J 3/407*** | (2006.01) |
| ***B41J 2/01*** | (2006.01) |
| ***B41M 5/00*** | (2006.01) |
| ***B65G 47/84*** | (2006.01) |

(52) U.S. Cl.

CPC ............ *B41J 3/40733* (2020.08); *B41J 2/01* (2013.01); *B41M 5/0088* (2013.01)

(58) Field of Classification Search

CPC .. B41J 3/4073; B41J 3/40731; B41J 3/40733; B65G 47/84

See application file for complete search history.

(56) References Cited

U.S. PATENT DOCUMENTS

| | | | |
|---|---|---|---|
| 5,029,523 | A | 7/1991 | Fields |
| 6,135,654 | A | 10/2000 | Jennel |
| 6,631,673 | B2 | 10/2003 | Aichele |
| 7,210,408 | B2 | 5/2007 | Uptergrove |

(Continued)

FOREIGN PATENT DOCUMENTS

| | | | |
|---|---|---|---|
| CN | 108357215 | A1 | 8/2018 |
| DE | 10 2008 012 502 | A1 | 9/2009 |

(Continued)

OTHER PUBLICATIONS

Graindourze, Marc, "More than just ink on a can: Direct container printing with inkjet", https://www.industrialprintblog.com/blog/2017/4/5/more-than-just-ink-on-a-can-direct-container-printing-with-inkjet, Apr. 5, 2017.

(Continued)

*Primary Examiner* — Anh T Vo

(74) *Attorney, Agent, or Firm* — Hoffmann & Baron, LLP

(57) ABSTRACT

An apparatus includes a plurality of print heads configured to print directly on a curved surface of each of the plurality of containers and a plurality of container holders for retraining each of the plurality of containers. Each of the plurality of container holders is configured to rotate a container retained therewithin and to move the container linearly relative to the plurality print heads in a continuous motion to maintain a print location on the curved surface of each of the plurality of containers at a substantially constant perpendicular distance from each of the plurality of print heads during a printing process. The apparatus may also provide for movement of the print heads during the printing process.

27 Claims, 6 Drawing Sheets

(56) References Cited

U.S. PATENT DOCUMENTS

| | | | |
|---|---|---|---|
| 7,467,847 | B2 | 12/2008 | Baxter et al. |
| 7,625,059 | B2 | 12/2009 | Uptergrove |
| 7,736,713 | B2 | 6/2010 | Uptergrove |
| 7,910,184 | B2 | 3/2011 | Uptergrove |
| 8,167,414 | B1 | 5/2012 | Uptergrove |
| 8,231,212 | B2 | 7/2012 | Uptergrove |
| 8,360,566 | B2 | 1/2013 | Uptergrove |
| 8,459,760 | B2 | 6/2013 | Uptergrove et al. |
| 8,522,989 | B2 | 9/2013 | Uptergrove |
| 8,579,402 | B2 | 11/2013 | Uptergrove |
| 8,864,295 | B2 | 10/2014 | Uptergrove |
| 8,888,210 | B2 | 11/2014 | Uptergrove |
| 9,032,872 | B2 | 5/2015 | Uptergrove |
| 9,090,090 | B2 | 7/2015 | Putzer et al. |
| 9,132,664 | B2 | 9/2015 | Schach |
| 9,272,815 | B2 | 3/2016 | Uptergrove |
| 9,302,506 | B2 | 4/2016 | Uptergrove et al. |
| 9,387,692 | B2 | 7/2016 | Palumbo |
| 9,463,616 | B2 | 10/2016 | Domeier et al. |
| 9,517,640 | B2 | 12/2016 | Till |
| 9,770,922 | B2 | 9/2017 | Cofler |
| 9,802,424 | B2 | 10/2017 | Sonnauer |
| 9,878,533 | B2 | 1/2018 | Sonnauer |
| 10,011,121 | B2 | 7/2018 | Clippingdale et al. |
| 10,252,544 | B2 | 4/2019 | Cassoni et al. |
| 10,279,600 | B2 | 5/2019 | Gertlowski et al. |
| 10,583,645 | B2 | 3/2020 | Cofler et al. |
| 10,596,839 | B2 | 3/2020 | Cofler |
| 10,696,068 | B2 | 6/2020 | Weber et al. |
| 10,828,886 | B2 | 11/2020 | Litvinov et al. |
| 11,198,306 | B2 | 12/2021 | Cofler |
| 11,724,519 | B2 | 8/2023 | Hill et al. |
| 2006/0250464 | A1 | 11/2006 | Sheinman |
| 2007/0039490 | A1 | 2/2007 | Aichele et al. |
| 2007/0157559 | A1* | 7/2007 | Till .......... B41J 3/40733 53/411 |
| 2011/0232514 | A1 | 9/2011 | Putzer et al. |
| 2012/0017783 | A1* | 1/2012 | Uptergrove .......... B41F 17/30 101/38.1 |
| 2015/0059600 | A1 | 3/2015 | Heidrich et al. |
| 2019/0070861 | A1 | 3/2019 | Regensburger et al. |
| 2020/0023658 | A1 | 1/2020 | Ko et al. |
| 2021/0300061 | A1 | 9/2021 | Boniface et al. |
| 2021/0354448 | A1 | 11/2021 | Xie |

FOREIGN PATENT DOCUMENTS

| | | | |
|---|---|---|---|
| DE | 10 2011 009 393 | A1 | 7/2012 |
| DE | 102013208065 | A1 | 7/2013 |
| DE | 10 2013 213 843 | A1 | 1/2015 |
| EP | 2 691 241 | B1 | 9/2016 |
| EP | 3 334 606 | B1 | 6/2020 |
| JP | 10-16314 | A | 1/1998 |
| JP | 2009-184121 | A | 8/2009 |
| WO | 03/002349 | A2 | 1/2003 |
| WO | 2017/032553 | A1 | 3/2017 |
| WO | 2018/108361 | A1 | 6/2018 |
| WO | 2019/042632 | A1 | 3/2019 |

OTHER PUBLICATIONS

European Search Report, Application No. 211668249, dated Oct. 21, 2022, 7 pages.

Canadian Office Action, Application No. 3,111,920, dated Jul. 5, 2022, 3 pages.

Canadian Office Action, Application No. 3,111,920, dated Feb. 9, 2023, 3 pages.

* cited by examiner

PRINTING APPARATUS FOR PRINTING DIRECTLY ONTO CONTAINERS

CROSS REFERENCE TO RELATED APPLICATION

This application is a continuation-in-part of U.S. patent application Ser. No. 16/839,181, filed Apr. 3, 2020, the contents of all of which are incorporated herein by reference in their entirety.

FIELD OF THE INVENTION

The present invention relates to printing apparatuses, and more particularly, to printing apparatuses configured to print directly onto a container.

BACKGROUND

Currently, there are printing apparatuses for printing onto containers in the marketplace. However, these printing apparatuses are configured to perform conventional printing on mostly flat labels or flat faces of containers. Printing directly onto curved surfaces of a container is difficult in as much as the distance from the print head and the surfaces change over a curved surface. For example, conventional print heads only dispense the ink a few millimeters if they are vertically positioned. Thus, the print head needs to be as close as possible to the surface of the container to retain print quality, e.g., the clearness of images or texts. If a distance greater than a few millimeters exists between the print head and the printing surfaces, which is often the case along a curved surface, the printing process may be difficult, and the print quality may not be satisfactory.

Accordingly, there exists a need for printing apparatuses to address effective printing on curved surfaces such as rounder curved surfaces.

SUMMARY

According to an embodiment of the present invention, a method and apparatus is provided for printing on a curved container surface. The apparatus includes a plurality of print heads configured to print directly on a curved surface of each of the plurality of containers and a plurality of container holders for retraining each of the plurality of containers. Each of the plurality of container holders is configured to rotate a container retained therewithin and to move the container linearly relative to the plurality print heads in a continuous motion to maintain a print location on the curved surface of each of the plurality of containers at a substantially constant perpendicular distance from each of the plurality of print heads during a printing process.

Additionally, in another embodiment, the print head may move to allow for printing on a round container.

These and other aspects of the present invention will be better understood in view of the drawings and following detailed description.

DETAILED DESCRIPTION

Figure 1:
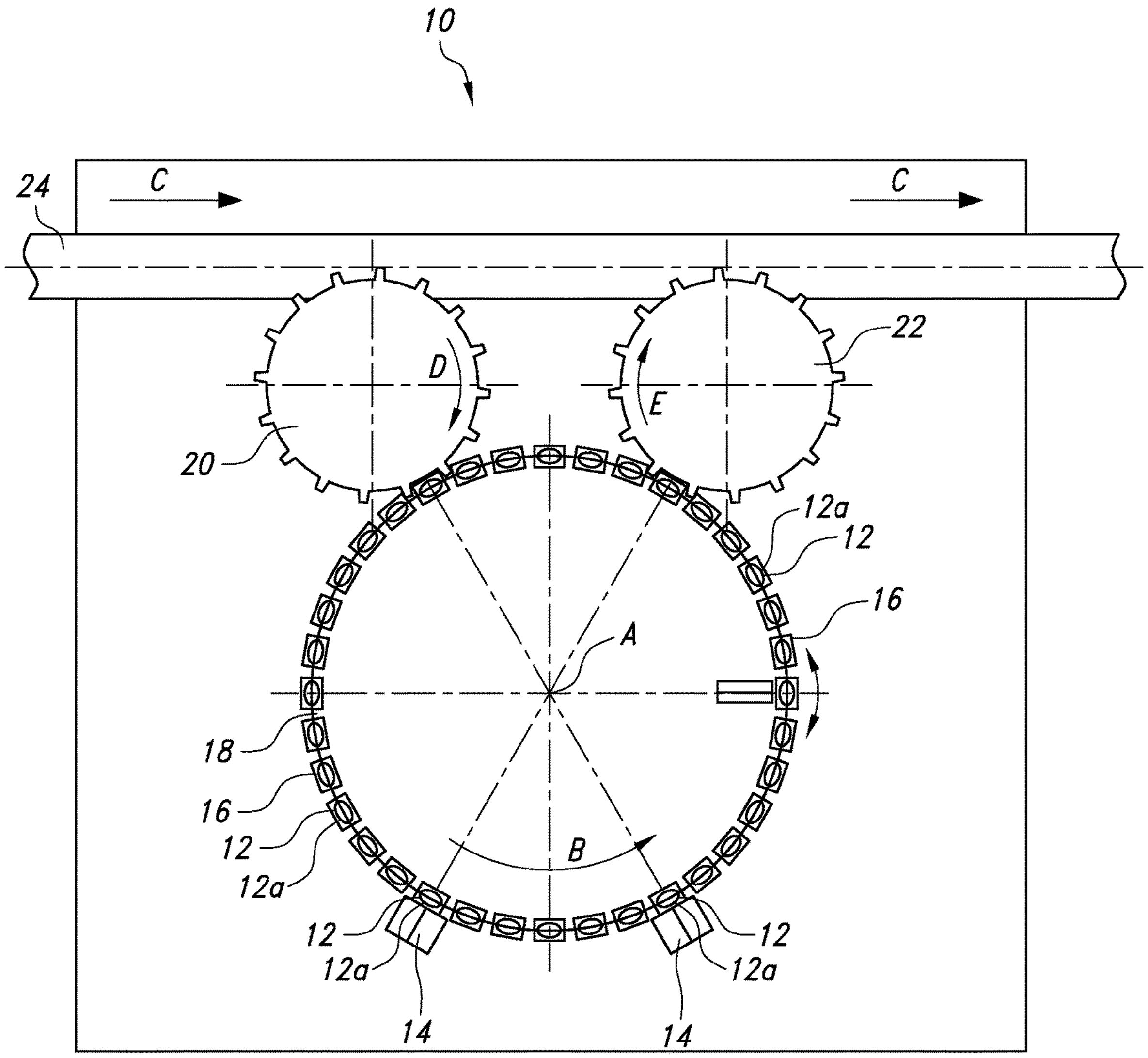
FIG. 1 is a top view of a printing apparatus, according to an embodiment of the present invention.

According to an embodiment of the present invention, referring to FIG. 1, there is shown a printing apparatus 10 configured to digitally print directly on the surfaces of a container 12 while the container 12 is in a continuous and constant motion. The printing apparatus 10 includes a plurality of print heads 14 for printing directly onto a curved surface 12*a* of the container 12 and a plurality of container holders 16 in a continuous automated operation. Each of the plurality of container holders 16 is configured to hold or retain the container 12 and is capable of providing both rotational movement and linear movement, as will be described in greater detail below. In the present illustrated embodiment, the containers 12 are shown as oval in general cross-section; but printing on containers having other non-flat cross-sectional shape is also contemplated.

Referring again to FIG. 1, the printing apparatus 10 further includes a printing wheel or turret 18 for rotating the containers 12 disposed within the plurality of container holders 16 about a turret vertical axis A, as will be described below, an infeed starwheel 20 is operable for transporting the containers 12 to the turret 18, and a discharge starwheel 22 is operable for transporting the containers 12 from the turret 18.

The circular turret 18 is configured to rotate in a counter-clockwise turret direction B about the turret vertical axis A with a constant speed. The turret 18 includes the plurality of container holders 16 mounted thereon for rotating the containers 12 to be printed. Each of the plurality of container holders 16 is disposed on the turret 18 with an evenly spaced distance therebetween.

A conveyor belt 24 moves in a longitudinal direction C and feeds the containers 12 to be printed to the infeed starwheel 20. The infeed starwheel 20 rotates in a clockwise infeed direction D, which is opposing to the rotational direction of the turret 18. Each of the containers 12 is transported to and retained in each corresponding container holder 16 via the infeed starwheel 20. Once the printing on the surface 12*a* of the container 12 is completed, the printed container 12 is transported from the container holder 16 via the discharge starwheel 22. The discharge starwheel 22 rotates in a clockwise discharge direction E, which is opposing to the rotational direction of the turret 18. After exiting from the container holder 16, the printed container 12 continuously moves on the conveyor belt 24 in the longitudinal direction C.

As noted above, the container 12 that may be used in connection with the present printing apparatus 10 has a shape with curved surfaces, e.g., oblong, oval, etc. Non-limiting examples of the container 12 to be printed include polyethylene terephthalate (PET) and high density polyethylene (HDPE), which may be made with monolayer or multilayer plastic materials.

Figure 2:
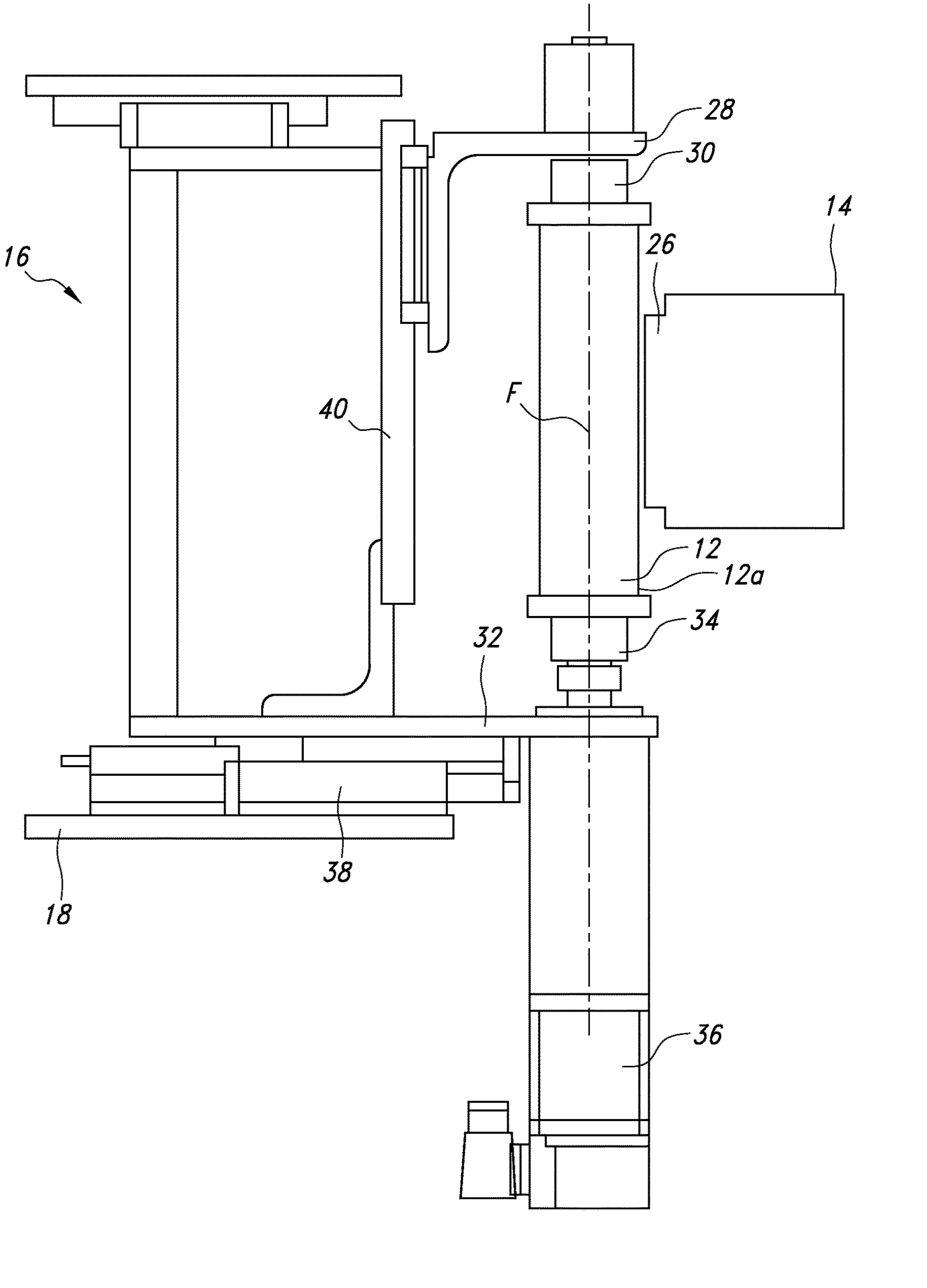
FIG. 2 is a side view of a container holder of the printing apparatus in FIG. 1.

Referring to FIGS. 1 and 2, the plurality of print heads 14 are arranged outside of the turret 18 and in close proximity to the turret 18 such that a nozzle dispensing path is substantially tangent to a moving direction (e.g., counter-clockwise turret direction B) of the curved surfaces 12*a* of the container 12 to be printed. Each of the plurality of print heads 14 is an inkjet print head having one or more nozzles 26 for dispensing printing ink. The one or more nozzles 26 are positioned such that they are substantially parallel with a container vertical axis F. In the depicted embodiment, each of the plurality of print heads 14 has one nozzle. Additionally, it is contemplated that the print head 14 is capable of moving horizontally to allow the curved printing surfaces 12*a* of the container 12 to be at a constant velocity during the printing process. As will be described in further detail with respect to the embodiment of FIGS. 4-6, this is also advantageous in printing on round containers.

Referring particularly to FIG. 2, each of the plurality of container holders 16 is configured to provide both rotational movement and linear movement during the printing process as each container holder 16 moves continuously along the counter-clockwise turret direction D, as will be described in greater detail below.

Each of the plurality of container holders 16 includes an upper slide 28 having an upper mandrel 30 mounted thereon, a lower slide 32 having a lower mandrel 34 mounted thereon. A rotary actuator 36 and a linear actuator 38 are employed to move the container 12 with respect to the print head 14, as will be described in below. Non-limiting examples of the rotary actuator and linear actuator are server motor and stepper motor.

The container 12 is secured and retained within its corresponding container holder 16 by the upper mandrel 30 and the lower mandrel 34, while moving along the counter-clockwise turret direction D and while being printed by the plurality of print heads 14. Specifically, the upper mandrel 30 and lower mandrel 34 engage with a top end portion of the container 12 and a bottom end portion of the container 12, respectively, such that each end portion of the container 12 is mounted onto the upper mandrel 30 and lower mandrel 34. The upper mandrel 30 and lower mandrel 34 are located on the upper slide 28 and lower slide 30, respectively, at a length from the plurality of the print heads 14 such that a consistent distance is maintained from the printing surfaces 12*a* of the container 12 to the plurality of print heads 14 during the printing process, as the container 12 rotates about the container vertical axis F. The container vertical axis F is parallel to the turret vertical axis A.

In the depicted embodiment, the lower mandrel 34 of each of the plurality of container holders 12 is operably connected to the rotary actuator 36. The rotary actuator 36 is implemented under the lower slide 32 of the container holder 12, as shown in FIG. 2, and the rotary actuator 36 provides rotational movement about the container vertical axis F during the printing process. The rotational movement ensures that during the printing process, the printed location of the printing surface of the container 12 is maintained substantially perpendicular to the stationary print head 14 during the printing process. Alternately, the rotary actuator 36 may be operably connected to the upper mandrel 30 of each of the plurality of container holders 12.

The rotary actuator 36 is configured such that it allows the container 12 to be rotated in either a counter-clockwise direction G or clockwise direction H with various desired degrees (e.g., up to 360 degrees). In the depicted embodiment, as shown in FIG. 3, the container 12 rotates about the container vertical axis F in the counter-clockwise direction G.

The linear actuator 38 is included in each of the plurality of container holders 16 for providing linear movement (toward and away from the print head 14) of the container holder 16. The linear actuator 38 is integrally connected to the lower slide 32 (which is connected to the upper slide 28 via a connecting bar 40) and disposed between the lower slide 32 and a top surface of the turret 18, as shown in FIG. 2. During the printing process, as the turret 18 continuously rotates at a constant speed and as the container 12 rotates, the linear actuator 38 allows the container 12 to move towards and away from the print head 14 along a line I. The linear movement combined with rotational movement allows a consistent distance to be retained from the printing surface of the container 12 to the print head 14, as the container 12 rotates and moves continuously along the moving direction (e.g., counter-clockwise turret direction D).

Figure 3A:
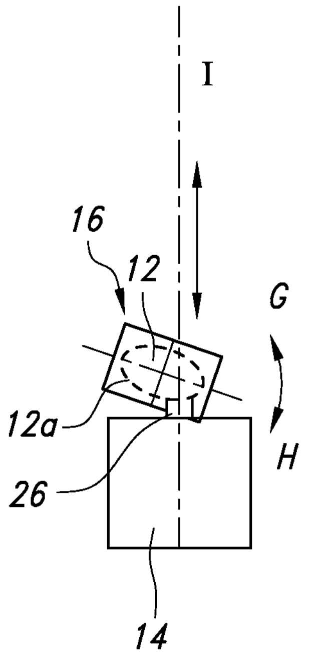
FIG. 3A-3E are top views of a container and a print head of the printing apparatus in FIG. 1, as the container continuously moves and rotates during a printing process.
Figure 3B:
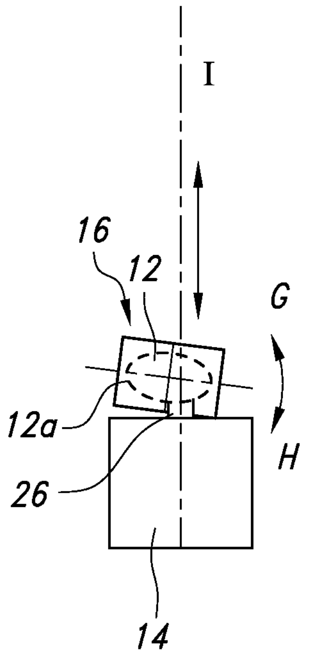
Figure 3C:
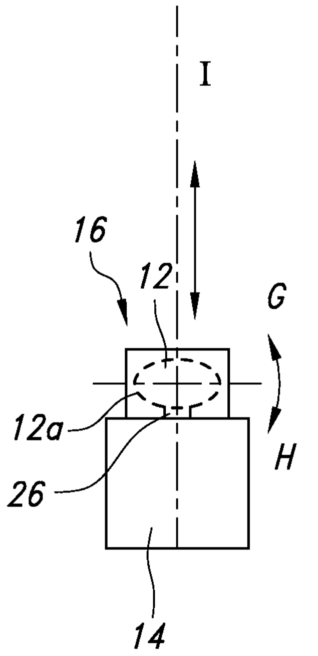
Figure 3D:
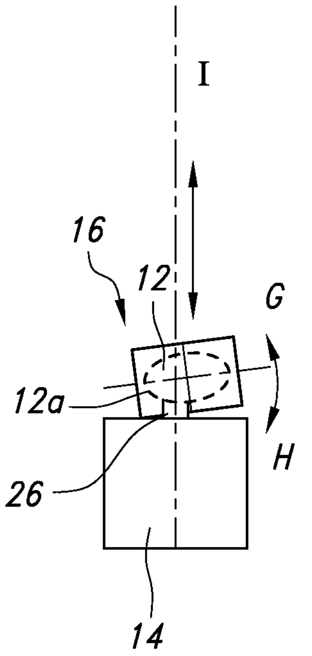

Referring to FIGS. 3A-3E, the printing process on the printing surfaces of the container 12 will be described. In the depicted embodiment, each container holder 16 having the container 12 therewithin enters a printing area with one side of the printing surface initially contacting with the nozzle 26 of the printing head 14, as shown in FIG. 3A. Due to the curved printing surfaces 12*a* of the container 12, the printing apparatus 10, specifically the container holder 16, is configured to rotate about the container vertical axis F as the printing on the container 12 progresses. As the container 12 is rotated about the container vertical axis F in the counter-clockwise direction G at an angular speed with the turret 18 being continuously moving in the counter-clockwise turret direction D, the nozzle 26 of the print head 14 dispenses the ink jet and prints directly on the curved printing surfaces 12*a* of the container 12 until the entire printing surface is printed in a desired fashion, as shown in FIG. 3B-3E. While the container 12 is being rotated during the printing process, the linear actuator 38 of the container holder 16 moves the container 12 towards and away from the nozzle 26 of the printing head 14 along the line I to maintain a consistent distance from the printing surfaces of the container 12 to the print head 14, allowing the printed materials on the curved surfaces to be in a good print quality (e.g., the clearness of images or texts).

Figure 3E:
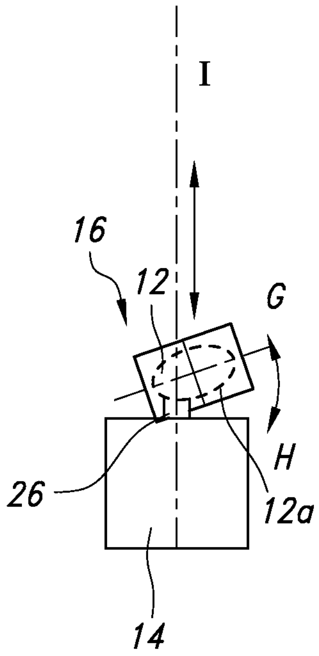

The printing process is continuous until the entire desired printing surface 12*a* of the container 12 is printed by the printing head 14 in one continuous motion. The print head 14 completes the printing process as the other side of the printing surface of the container 12 is reached, as shown in FIG. 3E. During the printing process, the print head 14 may remain stationary or move horizontally with respect to the turret 18 as the container 12 rotates about the container vertical axis F and moves linearly towards and away from the print head 14 to maintain a substantially constant distance between the print head 14 and the location of printing on the curved surface. The rotational movement and linear movement of the container 12 ensure that the location of printing on the curved surfaces 12*a* of the container 12 remains generally perpendicular to the print head 14 as the container 12 rotates during the printing process.

Accordingly, the combination of the rotational movement of the turret 18, the rotational movement of container 12, and the linear movement of container 12 provides a printing technique that may be achieved rapidly and continuously, and vastly improves printing quality on curved printing surfaces of the container 12.

From the foregoing, it will be appreciated that a printing apparatus according to the present invention provides a printing technique for directly printing on a container and improving printing quality on the curved printing surfaces of the container.

Figure 4:
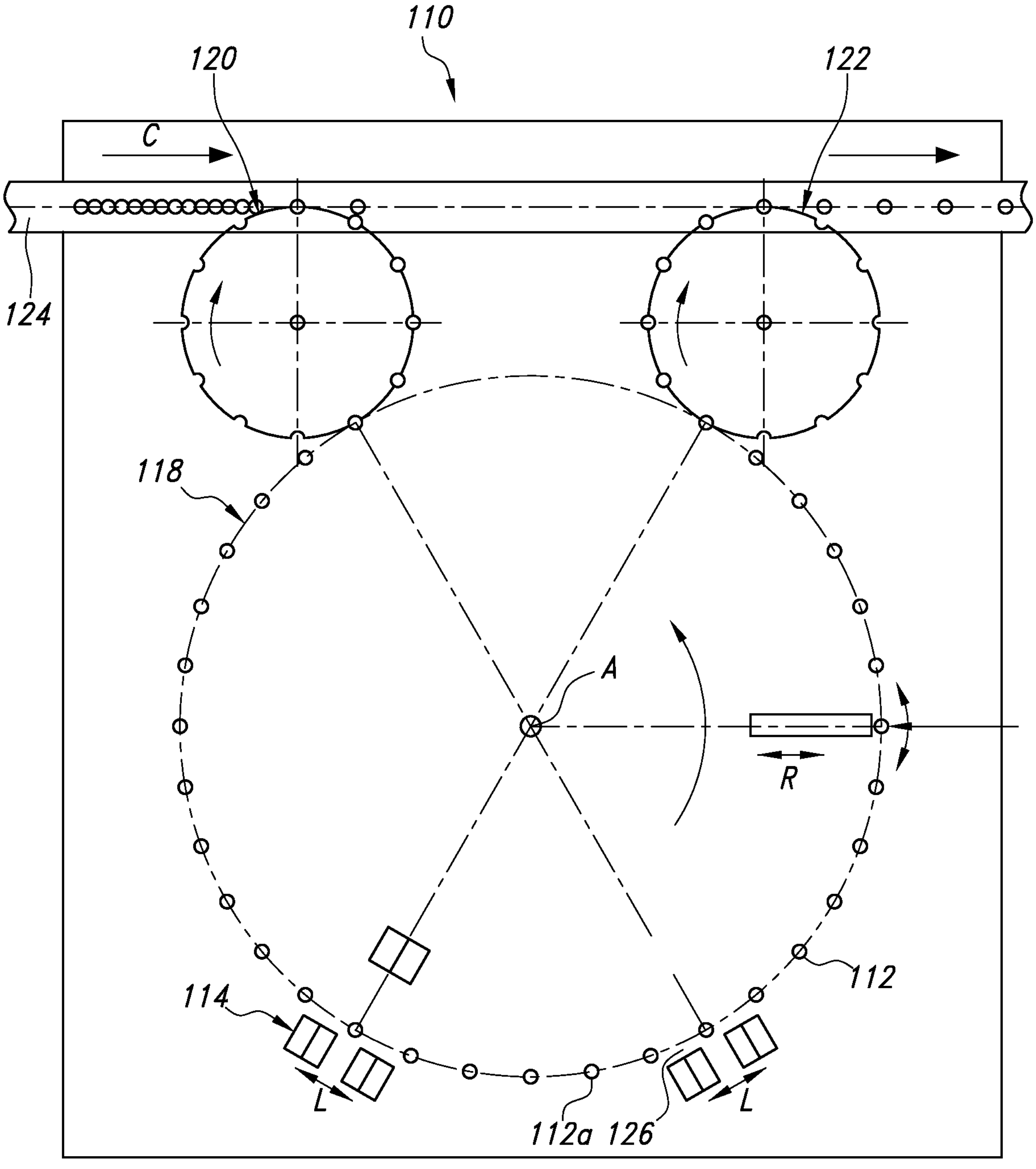
FIG. 4 is a top view of a printing apparatus in accordance with a further embodiment of the present invention.
Figure 5:
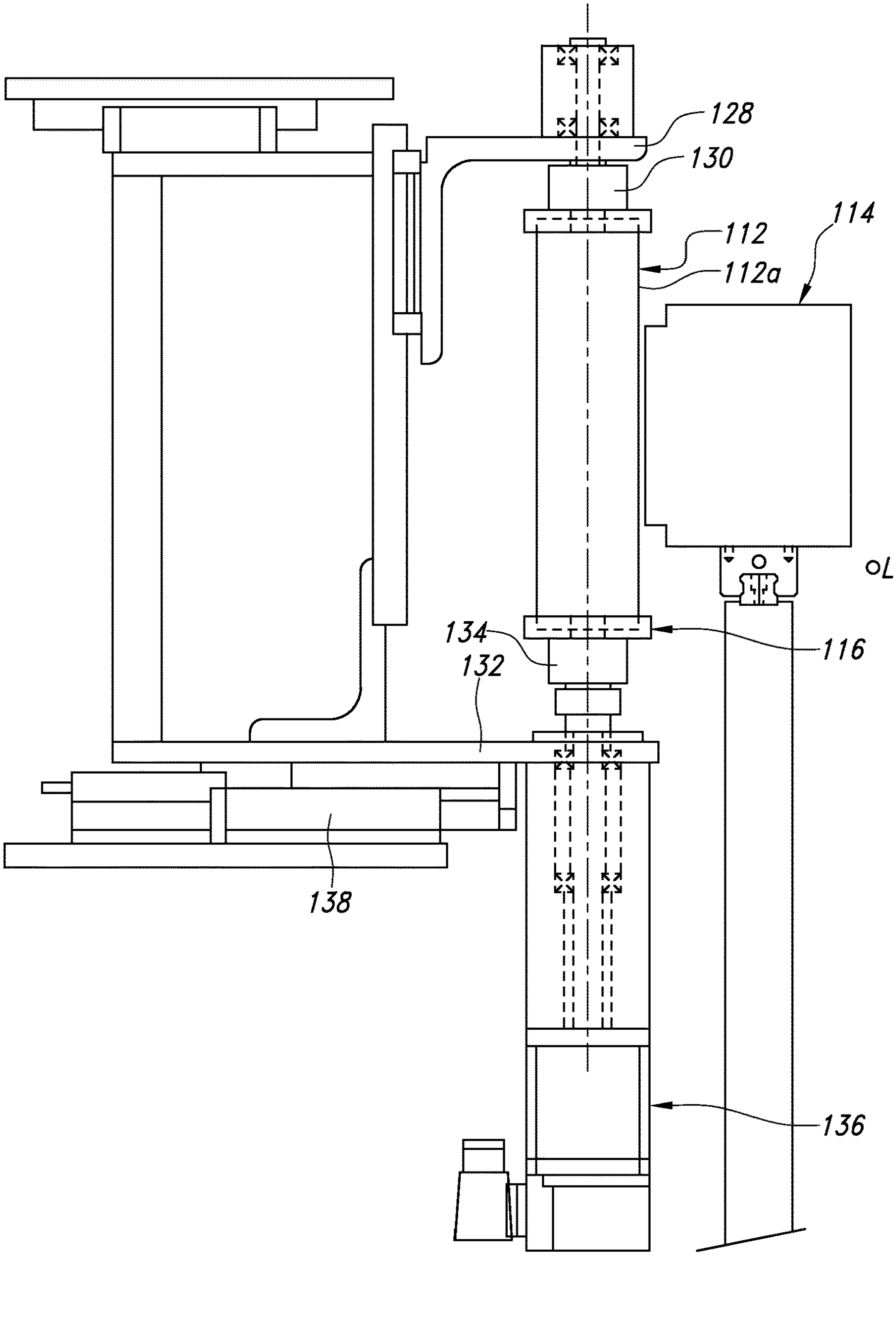
FIG. 5 is a side view of the container holder of the printing apparatus of FIG. 4.
Figure 6:
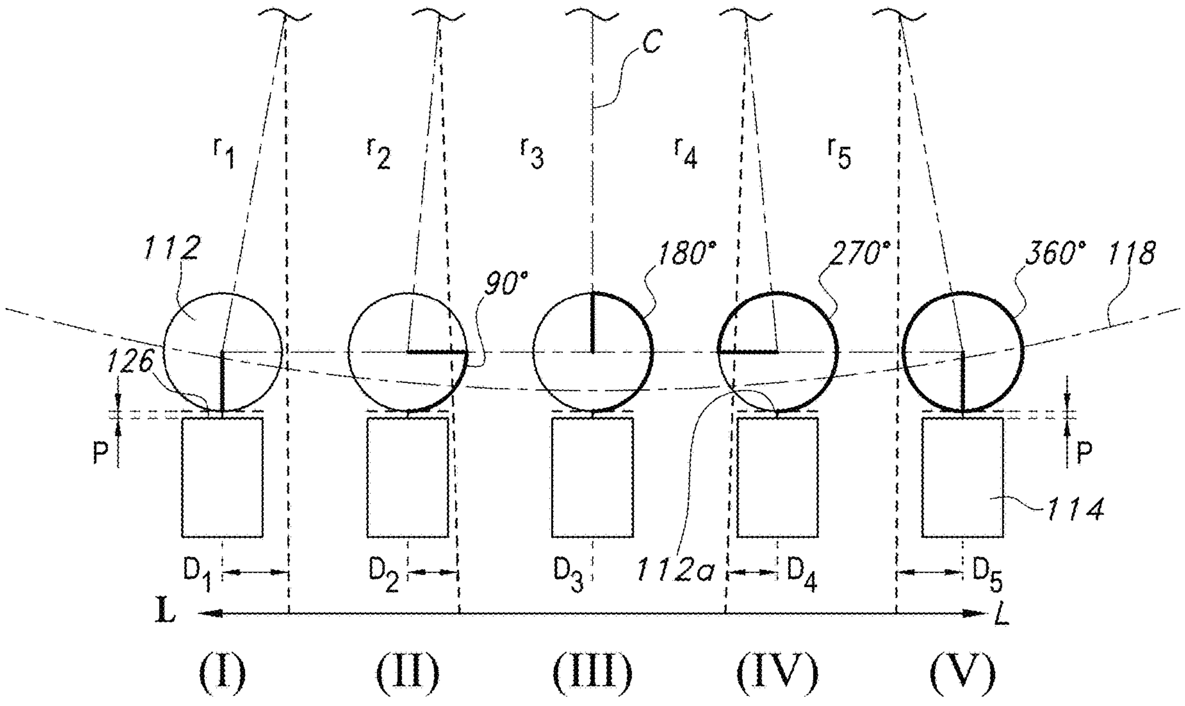
FIG. 6 is a schematic depiction of movement of the container about the turret during the printing process.

Referring now to FIGS. 4-6, a further embodiment of the present invention is shown which is particularly advantageous in printing on round bottles.

The present embodiment is substantially similar to the embodiment described above. For simplicity, with respect to the present embodiment, similar reference numerals will be used to denote similar elements.

The printing apparatus 110 of the present embodiment includes a plurality of print heads 114 for printing directly onto a curved surface 112*a* of a container 112 held on a plurality of container holders 116 (FIG. 5) in a continuous automated operation. Each of the container holders 116 is configured to hold and retain a container 112 and is capable of providing both rotational movement and linear movement similar to that described above.

In the present illustrative embodiment, containers 112 are shown to be round containers in cross section. However, the present embodiment is not limited thereto.

As with the above embodiment, the present embodiment of the printing apparatus 110 includes a wheel or turret 118 for rotating the containers 112 around an axis A in the direction of arrow B. An infeed star wheel 120 is operable for transporting the containers 112 to the turret 118 and a discharge star wheel 122 is operable for transporting the containers 112 from the turret 118. A conveyor belt 124 moves in a longitudinal direction C and feeds the containers 112 to be printed into the infield star wheel 120. The discharge star wheel 122 accepts the printed containers and after exiting from the container holder 116, the printed containers 112 continuously move on a conveyor belt 124 in the longitudinal direction C. The operation of the conveyor belt, turret and star wheels are substantially similar to that described above with respect to the previous embodiment.

Referring additionally to FIG. 5 specifically, each of the plurality of container holders 116 is configured to provide both rotational movement and linear movement during the printing process.

The construction and movement of the container holders 116 is substantially similar to that described above with respect to FIG. 2. Each container holder 116 includes an upper slide 128 with an upper mandrel 130 mounted thereto, a lower slide 132 having a lower mandrel 134 mounted thereto.

A rotary actuator 136 and a linear actuator 138 are employed to move the container 112 with respect to the print head 114 in a manner similar to that described above with respect to FIG. 2 during the printing process. As the turret 118 continuously rotates preferably, but not necessarily, at a constant speed and as container 112 rotates, the linear actuator 138 allows the container to move towards and away from the print head (arrow R in FIG. 4). The linear movement combined with the rotational movement allows a constant distance to be maintained between the printing surface of the container 112 and the print head 114 as the container rotates and moves continuously along the moving direction. While a rotary and linear actuator are described, the same movement may be accomplished via servo motor, stepper motor, cams, pneumatics, etc.

In addition, with respect to round bottles, it is has been found that constant distance between the printing surface of container 112 and the print head may be further facilitated by arranging the print head 114 to be movable in a back and forth linear direction L as the container rotates about turret 118.

Different from the embodiment shown in FIG. 2, the embodiment of FIG. 5 mounts the print head 114 for longitudinal movement generally along the path of the container holder 116 about turret 118 as indicated by double headed arrows L in FIGS. 4-6. In FIG. 5 the movement is into and out of the page.

Referring specifically now to FIG. 6, the printing process for printing on surfaces 112*a* of round containers 112 may be described. While substantially similar to that described above with respect to FIGS. 3A-E, in this embodiment the printing process incorporates movement of the print head 114 along with movement of the container holder 116.

Each container 112 supported on the container 116 holder knot shown) enters a printing area so that one point of the surface 112*a* of container 112 is positioned adjacent nozzle 126 of printing head 114. A center line C defines a neutral position for the print head along path L. As shown in FIG. 6, the print head is initially positioned at a location to the left a distance of $D_1$ from the center line C. At this position, the container 112 on the container holder 116 is positioned fully extended toward the circumference of the turret 118 defined as $r_1$ in FIG. 6. This defines position in (I) where the nozzle 126 (not shown) is a distance P from container surface 112*a*. As the container 112 moves about the turret and is rotated counter-clockwise by the container holder 116, the print head 114 prints on the surface 112*a* of the container. The container 112 also retracts away from the circumference of the turret from its fully extended position $r_1$ to a position $r_2$ (which is less than $r_1$) defining position (II) where at that point the container 112 has been printed on 90° of the container surface 112*a*. The print head 114 moves along path L with the movement of container so as to maintain the constant distance P between the print head 114 and the container 112. When the container is retracted to $r_2$ the print head has moved to the right to a positon which is a distance $D_2$ (less than $D_1$) from the center line C.

As the container 112 continues to move about the turret 118, it is retracted further to a position $r_3$ which less than $r_2$ defined at position (III). Since the container 112 is continually rotating in a counter-clockwise direction, the container 112 will be printed on 180° of the container surface at position (III).

The print head will now be moved along path L to a distance $D_3$ which is at the center line C so as to maintain the constant distance P.

The container 112 continues to move about the turret 118 from the positon (III) to (IV) where, due to the counter-clockwise rotation, the container is now printed on 270° of the container. To maintain the constant distance P, the container is extended to $r_4$ which is equal to $r_2$ and the print head moves back to a position which is a distance $D_4$ from center line C which is equal to distance $D_2$ but in the opposite direction.

Still further, the container moves along the turret to a position (V) where the container is extended to a radius $r_5$ which is equal to $r_1$. As the container continues its counter-clockwise revolution it is now printed on 360° of the container. Similarly, the print head has now moved a distance $D_5$ which is equal to distance $D_1$, but in the opposite direction so as to maintain the constant distance P between the print head and the container D.

While the present embodiment shows printing 360° about the container 112, it may be appreciated that printing may take place on less than the entire circumference of the container.

Thus by movement of the container toward and away from the circumference of the turret while rotating the container and by movement of the print head a relatively constant distance is maintained between the print head and the container surface during printing.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An apparatus for printing on a plurality of containers, the apparatus comprising:

a plurality of print heads configured to print directly on a curved surface of each of the plurality of containers; and a plurality of container holders for retraining the plurality of containers, each of the plurality of container holders configured to rotate a container retained therewithin and to move the container linearly relative to the plurality print heads in a continuous motion to maintain a print location on the curved surface of each of the plurality of containers at a substantially constant perpendicular distance from each of the plurality of print heads during a printing process, each of the plurality of container holders further includes an upper slide having an upper mandrel mounted thereon, a lower slide having a lower mandrel mounted thereon, a rotary actuator, and a linear actuator; and wherein each of the plurality of container holders is configured to move linearly along a line that is perpendicular to the print head, allowing a consistent distance from the printing surface of the container to the print head, as the container rotates and moves continuously during the printing process.

2. The apparatus of claim 1, wherein each of the plurality of container holders is configured to rotate the container about a container vertical axis.

3. The apparatus of claim 1, wherein the container in each of the plurality of container holders is rotated by the rotary actuator.

4. The apparatus of claim 3, wherein the rotary actuator is configured to rotate in a clockwise direction or a counter-clockwise direction.

5. The apparatus of claim 3, wherein the container is rotated 360 degrees via the rotary actuator.

6. The apparatus of claim 1, wherein the container in each of the plurality of container holders is moved linearly by the linear actuator.

7. The apparatus of claim 1, wherein the upper mandrel and lower mandrel engage with a top end portion of the container and a bottom end portion of the container, respectively, such that each end portion of the container is mounted onto the upper mandrel and lower mandrel.

8. The apparatus of claim 1, wherein lower mandrel is operably connected to the rotary actuator.

9. The apparatus of claim 1, wherein the rotary actuator is implemented under the lower slide of the container holder.

10. The apparatus of claim 1, wherein the apparatus further comprises a turret, an infeed starwheel, and a discharge starwheel.

11. The apparatus of claim 10, wherein the infeed starwheel transports the containers from a conveyor belt to the turret.

12. The apparatus of claim 11, wherein the discharge starwheel transports the containers from the turret to the conveyor belt.

13. The apparatus of claim 10, wherein the plurality of container holders are mounted on the turret, with an evenly spaced distance therebetween.

14. The apparatus of claim 10, wherein the linear actuator is connected to the lower slide that is connected to the upper slide via a connecting bar and is disposed between the lower slide and a top surface of the turret.

15. The apparatus of claim 1, wherein the rotary actuator and the linear actuator are servo motor and stepper motor.

16. The apparatus of claim 1, the plurality of print heads are configured to move horizontally in a moving direction of the plurality of the containers.

17. The apparatus of claim 1, wherein the plurality of print heads are configured to move horizontally in a moving direction of the plurality of the containers such that the curved surfaces of the containers are at a constant velocity during the printing process.

18. An apparatus for printing on a plurality of containers, the apparatus comprising:

a rotating turret for supporting said plurality of containers adjacent a circumference thereof for rotational movement about a center axis;

a plurality of print heads configured to print directly on a curved surface of each of the plurality of containers; and a plurality of container holders for retraining the plurality of containers, each of the plurality of container holders configured to rotate a container retained therewithin and to move the container in a substantially linear direction toward and away from said circumference of said turret in a continuous motion;

said plurality of print heads being supported for movement in a linear direction generally perpendicular to said linear direction of movement of said containers to maintain a print location on the curved surface of each of the plurality of containers at a substantially constant perpendicular distance from each of the plurality of print heads during a printing process as the containers are rotated.

19. The apparatus of claim 18, wherein each of the plurality of container holders is configured to rotate the container about a container vertical axis.

20. The apparatus of claim 18, wherein each of the print heads is moveable in an opposed linear direction.

21. The apparatus of claim 18, wherein each of the plurality of container holders comprises an upper slide having an upper mandrel mounted thereon, a lower slide having a lower mandrel mounted thereon, a rotary actuator, and a linear actuator.

22. The apparatus of claim 21, wherein the container in each of the plurality of container holders is rotated by the rotary actuator.

23. The apparatus of claim 21, wherein the container in each of the plurality of container holders is moved linearly by the linear actuator.

24. The apparatus of claim 21, wherein the upper mandrel and lower mandrel engage with a top end portion of the container and a bottom end portion of the container, respectively, such that each end portion of the container is mounted onto the upper mandrel and lower mandrel.

25. The apparatus of claim 21, wherein lower mandrel is operably connected to the rotary actuator.

26. The apparatus of claim 21, wherein the rotary actuator is implemented under the lower slide of the container holder.

27. The apparatus of claim 21, wherein the apparatus further comprises a turret, an infeed starwheel, and a discharge starwheel.

* * * * *